United States Patent
Marum et al.

(10) Patent No.: US 10,803,473 B2
(45) Date of Patent: Oct. 13, 2020

(54) RETAIL DEPLOYED CUSTOMER RELATIONSHIP MANAGEMENT

(71) Applicant: SugarCRM Inc., Cupertino, CA (US)

(72) Inventors: Matthew Marum, Cary, NC (US); Wes Moran, Merrimack, NH (US)

(73) Assignee: SUGARCRM INC., Cupertino, CA (US)

( * ) Notice: Subject to any disclaimer, the term of this patent is extended or adjusted under 35 U.S.C. 154(b) by 1400 days.

(21) Appl. No.: 14/562,659

(22) Filed: Dec. 5, 2014

(65) Prior Publication Data

US 2016/0162908 A1    Jun. 9, 2016

(51) Int. Cl.
| | | |
|---|---|---|
| *G06Q 30/00* | (2012.01) | |
| *G06Q 30/02* | (2012.01) | |
| *G06Q 30/06* | (2012.01) | |

(52) U.S. Cl.
CPC ..... *G06Q 30/0201* (2013.01); *G06Q 30/0254* (2013.01); *G06Q 30/0623* (2013.01); *G06Q 30/0639* (2013.01)

(58) Field of Classification Search
None
See application file for complete search history.

(56) References Cited

U.S. PATENT DOCUMENTS

| | | | | |
|---|---|---|---|---|
| 2012/0016740 | A1* | 1/2012 | Ramer | G06Q 30/08 705/14.46 |
| 2013/0073388 | A1* | 3/2013 | Heath | G06Q 30/02 705/14.53 |
| 2015/0073907 | A1* | 3/2015 | Purves | G06F 3/011 705/14.58 |
| 2015/0081474 | A1* | 3/2015 | Kostka | H04W 88/08 705/26.8 |

(Continued)

FOREIGN PATENT DOCUMENTS

| | | | | | |
|---|---|---|---|---|---|
| JP | 2015136044 | A | * | 7/2015 | G06Q 30/02 |
| JP | 2016170235 | A | * | 9/2016 | G10K 15/04 |

OTHER PUBLICATIONS

Smart Card Alliance. Bluetooth Low Energy (BLE) 101: A Technology Primer with Example Use Cases. (Jun. 2014). Retrieved online Jun. 4, 2020. https://www.securetechalliance.org/resources/pdf/BLE101-FINAL-053014.pdf (Year: 2014).*

(Continued)

*Primary Examiner* — James A Reagan
(74) *Attorney, Agent, or Firm* — Steven M. Greenberg, Esq.; Shutts & Bowen LLP

(57) ABSTRACT

Embodiments of the invention provide a method, system and computer program product for retail deployed CRM. A CRM method for retail environments includes sensing entry of a mobile device into a physical space and identifying a customer record for a customer in a CRM system associated with the detected mobile device. The method also includes (Continued)

thereafter detecting a proximity of the mobile device to a product stored in the physical space and creating an opportunity record in the CRM system in connection with the customer for the product. Finally, the method includes responding to sensing egress of the mobile device from the physical space, by marking the opportunity record as closed-won if the product has been purchased by the customer.

18 Claims, 2 Drawing Sheets

(56) References Cited

U.S. PATENT DOCUMENTS

| | | | | |
|---|---|---|---|---|
| 2015/0112838 A1* | 4/2015 | Li | ............ | H04W 4/21 |
| | | | | 705/26.61 |
| 2015/0170258 A1* | 6/2015 | Kulig | ............ | G06Q 30/0639 |
| | | | | 705/26.9 |
| 2015/0262120 A1* | 9/2015 | Kulig | ............ | G06Q 10/087 |
| | | | | 705/28 |
| 2015/0302500 A1* | 10/2015 | Koch | ............ | G06Q 30/0639 |
| | | | | 705/26.61 |
| 2016/0071148 A1* | 3/2016 | Joshi | ............ | G06F 21/6218 |
| | | | | 705/14.5 |
| 2016/0148218 A1* | 5/2016 | Koch | ............ | G06Q 50/01 |
| | | | | 705/7.29 |

OTHER PUBLICATIONS

National Retail Federation. Mobile Retailing Blueprint A Comprehensive Guide for Navigating the Mobile Landscape. (Jan. 4, 2011). Retrieved online Jun. 4, 2020. http://www.nacs.org/portals/NACS/Uploaded_Documents/PDF/ToolsResources/BS/Mobile_Retailing_Blueprint.pdf (Year: 2011).*

Brin, Dinah Wisenberg. Retailer beacons track your phone as you shop, raising privacy issues. (Nov. 12, 2014). Retrieved online Jun. 4, 2020. https://www.creditcards.com/credit-card-news/retailer-beacons-track-phone-shop-privacy-1280.php (Year: 2014).*

* cited by examiner

RETAIL DEPLOYED CUSTOMER RELATIONSHIP MANAGEMENT

BACKGROUND OF THE INVENTION

Field of the Invention

The present invention relates to customer relationship management (CRM) and more particularly to the utilization of CRM in a retail setting.

Description of the Related Art

CRM refers to the interaction that a business entity enjoys with its customers, whether the business entity provides sales or services to the customer. CRM is often thought of as a business strategy that enables business managers to understand the customer, to retain customers through better customer experience, to attract new customers, increase profitability and to decrease customer management costs. In real terms, however, CRM systems are used specifically to manage business contacts, clients, contract wins and sales leads. As such, CRM solutions provide the end user with the customer business data necessary to provide services or products desired by the customers, to provide better customer service, to cross-sell and to up-sell more effectively, to close deals, retain current customers and understand the identity of the customer.

CRM systems are often used to manage the entire lifecycle of a relationship between a customer and an organization. In this regard, a CRM system is enabled to manage tasks for organizational representatives associated with the targeting and acquisition of a new customer, the fulfillment of a sale to a new customer or an existing customer, and the maintenance of a relationship with an existing customer. Much of the role of the CRM system is to store data documenting the relationship between representatives of an organization and its customers and prospective customers. Thus, the typical CRM system takes a long view of the customer relationship from inception to conclusion which may last many years or even decades.

The use of a CRM system in the in-store retail setting generally is limited to data collection and transaction processing. In this regard, to the extent that a point of sale system within a store has been adapted to communicate with a CRM system, the point of sale system typically receives contact and billing information for a customer at checkout, and additionally reports the nature of the products purchased to the CRM system subsequent to checkout. Optionally, targeted couponing is included as part of the CRM to point of sale integration. Little more of the CRM system is utilized in the in-store setting. Consequently, substantial advantages afforded by CRM have not readily translated to the retail setting.

BRIEF SUMMARY OF THE INVENTION

Embodiments of the present invention address deficiencies of the art in respect to CRM and provide a novel and non-obvious method, system and computer program product for retail deployed CRM. In an embodiment of the invention, a CRM method for retail environments includes sensing entry of a mobile device into a physical space and identifying a customer record for a customer in a CRM system associated with the detected mobile device. The method also includes thereafter detecting a proximity of the mobile device to a product stored in the physical space and creating an opportunity record in the CRM system in connection with the customer for the product. Finally, the method includes responding to sensing egress of the mobile device from the physical space, by marking the opportunity record as closed-won if the product has been purchased by the customer.

In one aspect of the embodiment, the opportunity record is marked pending responsive to the sensing of the egress of the mobile device from the physical space if the product has not been purchased by the customer. However, in another aspect of the embodiment, the opportunity record is marked closed-lost responsive to the sensing of the egress of the mobile device from the physical space if the product has not been purchased by the customer. In yet another aspect of the embodiment, a CRM action is triggered for the opportunity record. For instance, the CRM action is transmitting product information for the product to the mobile device, or transmitting related product information for the product to the mobile device or transmitting a coupon for the product to the mobile device. As another example, the CRM action is messaging a mobile device of a sales agent present within the physical space with information from the customer record and information from the opportunity record. For example, the mobile device of the sales agent may be smart eye-ware with an optical head-mounted display.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for CRM in a retail setting. In accordance with an embodiment of the invention, customers entering a store can be detected by way of the presence of a computing device associated with each customer, and a record can be created therefor within a portion of a CRM system designated for the store. In response, one or more CRM actions can be triggered, such as creating a blank opportunity or lead record in the CRM system for the customer in connection with a particular sales associate, transmitting a coupon or set of store specials to the computing device, messaging an assigned sales associate with data pertaining to the customer so as to prompt the sales associate to approach the customer as the customer enters the store.

Thereafter, as a customer approaches a product offered for sale within the store, the proximity of the computing device to the product can be detected and the product can be recorded in the CRM system in connection with the customer as a sales opportunity. Consequently, again one or more CRM actions can be triggered, such as transmitting a coupon for the product to the computing device, messaging a sales associate with data pertaining to the customer and the product, or messaging the computing device with product information pertaining to the product, or to a related product. Upon checkout of a customer, each sales opportunity recorded for the customer can be marked as closed-won or closed-lost depending upon the products purchased at check out. In this way, the power of CRM can translate to the retail setting.

Figure 1:
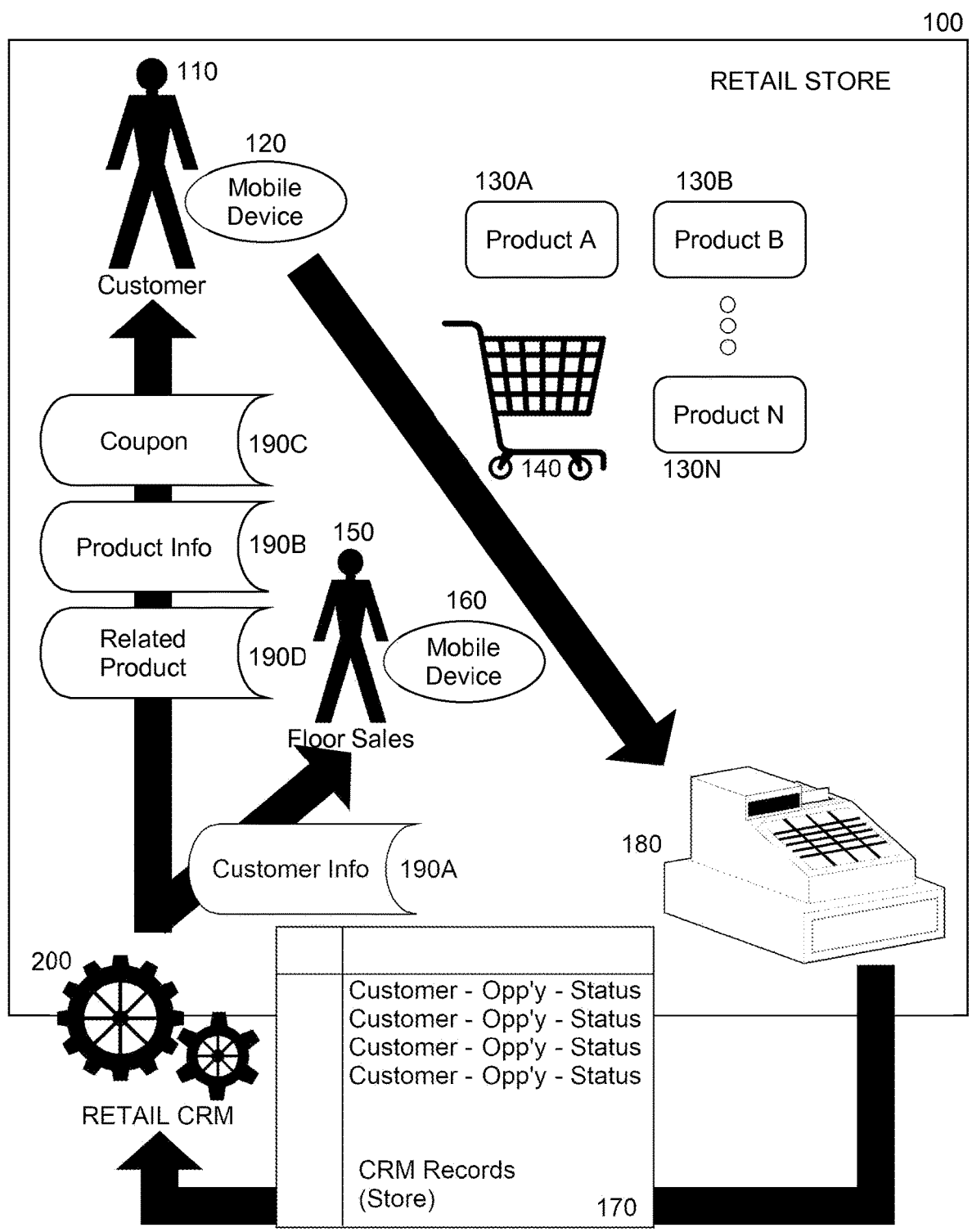
FIG. 1 is a pictorial illustration of a process for CRM in a store.

In further illustration, FIG. 1 pictorially shows a process for CRM in a store. As shown in FIG. 1, a retail CRM system 200 can detect the presence of a customer 110 within a retail store 100, for example by way of a mobile device 120 reporting its position within the confines of the retail store 100, or by way of detecting a wireless transmitter of the mobile device 120. Responsive to detecting the mobile device 120 of the customer 110, the retail CRM system 200 can create a record amongst the records 170 of the retail CRM system 200 indicating the presence of the customer 110 within the retail store 100. Further, responsive to detecting the mobile device 120 of the customer 110, the retail CRM system 200 can message a sales associate 150 customer information 190A pertaining to the customer 110 so as to provoke the sales associate 150 to physically approach the customer 110 within the retail store 100. Thereafter, as the customer 110 moves about the retail store 100, the location 140 of the customer 110 can be determined. In this regard, the location 140 can be determined based upon a detection of the presence of mobile device 120 proximate to a sensor at the location 140, or by way of the reporting of a position of the mobile device 120 by the mobile device 120.

In any event, as it is determined that the customer 110 is at the location 140, a reference to one or more products 130A, 130B, 130N present in proximity to the location 140 can be added to the records 170 of the retail CRM system 200 as new opportunities. In response to the addition of the records 170, the retail CRM system 200 can process one or more rules to perform one or more corresponding CRM activities 190A, 190B, 190C, 190D. Such CRM activities 190A, 190B, 190C, 190D can include messaging customer information 190A regarding the customer 110 to a mobile device 160 of a sales associate 150 also present within the retail store 100. With this customer information 190A, the sales associate 150 can be directed to assist the customer 110 as the location 140 with respect to the products 130A, 130B, 130N without requiring the customer 110 to request assistance or explain the interest of the customer 110 in the products 130A, 130B, 130N.

Others of the CRM activities 190A, 190B, 190C, 190D include messaging the mobile device 120 of the customer 110, product information 190B regarding the products 130A, 130B, 130N, a coupon 190C directed to the products 130A, 130B, 130N, or suggesting a related product 190D to the customer 110. In any event, once the customer 110 has approached a point-of-sale system 180, it can be determined which of the products 130A, 130B, 130N, if any, the customer 110 has purchased, and the records 170 of the retail CRM system 200 can be updated accordingly. Further, once it is detected that the customer 110 has exited the retail store 100, the opportunities of the records 170 for the customer 110 can be deleted.

Figure 2:
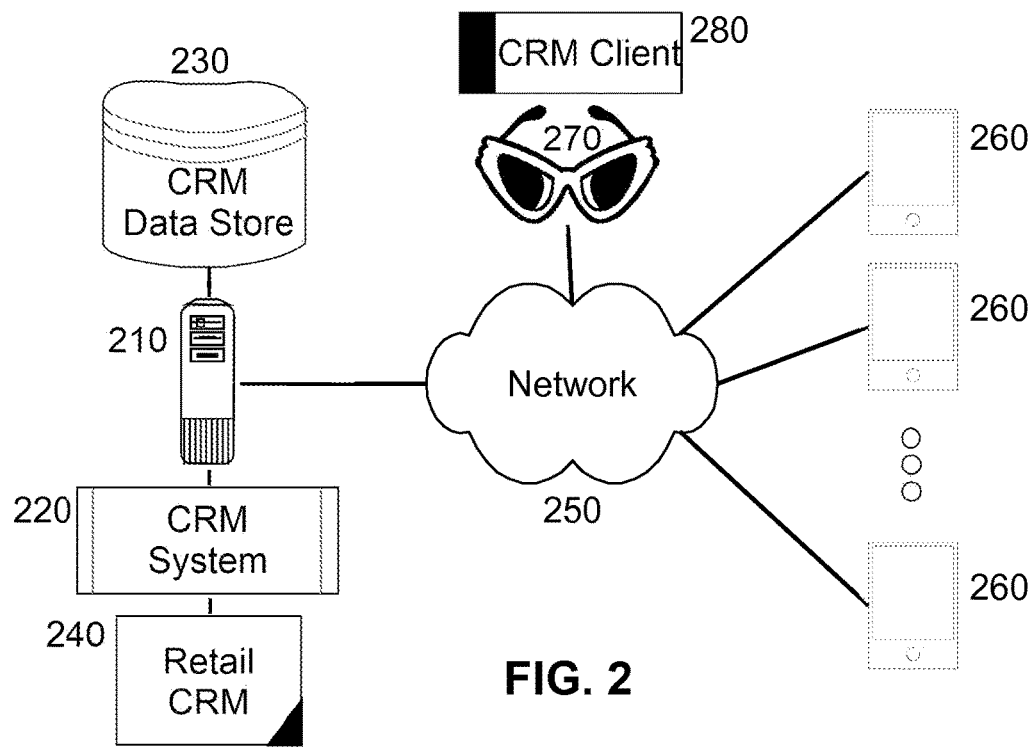
FIG. 2 is a schematic illustration of a CRM data processing system configured for CRM in a store; and, FIG. 3 is a flow chart illustrating a process for CRM in a store.

The process described in connection with FIG. 1 can be implemented in connection with a CRM data processing system. In yet further illustration, FIG. 2 schematically shows a CRM data processing system configured for CRM in a store. The system can include a host computing system 210 that includes one or more computers each with memory and at least one processor. The host computing system 210 can support the operation of a CRM system 220 providing CRM systems including the creation, modification, deletion and updating of CRM data in a CRM data store 230. The CRM data can include existing and potential customer information, product information and sales agent information, by way of example.

Of note, the host computing system 210 can be intermittently communicatively coupled to different mobile devices 260, each being associated with a different customer registered in the CRM data store 230. The host computing system 210 also can be intermittently communicatively coupled to one or more mobile devices 270 (only a single device shown for ease of illustration) associated with a sales agent registered in the CRM data store 230. In one aspect of the embodiment, the mobile device 270 can be a wearable device such as smart eye-ware with an optical head-mounted display. The mobile device 270 can include a processor and memory enabled to host the execution of a CRM client 280 providing a user interface to the CRM system 220 and more particularly, a retail CRM module 240 coupled to the CRM system 220.

In this regard, the retail CRM module 240 can include program code that when executed in the memory of the host computing system 210 by one or more processors of the host computing system 210 is enabled to detect a presence of the mobile devices 260 as the devices 260 enter within a physical space managed by the retail CRM module 240—namely a store. For example, each mobile device 260 can determine its own position and can report its position to the retail CRM module 240. To the extent that the determined position exists within the boundaries of the physical space managed by the retail CRM module 240, the mobile device 260 can be determined to be present within the physical space. Thereafter, an existing customer of the CRM system 220 can be retrieved for the mobile device 260, or if no customer yet exists in the CRM system 220 for the mobile device 260, a new customer can be created.

The program code of the retail CRM system 240 during execution subsequently can detect the proximity of the mobile device 260 to one or more products placed within the physical space. In this regard, again the position of the mobile 260 can be determined and correlated to a known location of the product or products. Alternatively, near field communications, short range wireless communications or radio frequency identification can be used to detect the proximity of the mobile device 260 to the product or products, with the mobile device 260 detecting the presence of a sensor coupled to shelving or product packaging of the product or products, or conversely, a sensing device coupled to the shelving or product packaging can sense the presence of the mobile device 260.

In any event, the program code of the retail CRM module 240 can be enabled to respond to the detection of the proximity of the mobile device 260 to the product or products by creating one or more opportunity records in the CRM data store 230 for each of product or products. Based upon the opportunity record, the program code of the retail CRM system 240 can trigger one or more CRM actions in the CRM system 220, for example by transmitting to the CRM client 280 data pertaining to the customer and the product or products. The data pertaining to the customer, of course, may include the location of the customer within the physical space. The data, in turn, can be presented in the mobile device 270, for instance in an optical head mounted display so as to alert the sales agent of a need to service the customer and to close the newly created opportunities.

Other actions can include transmitting to the mobile device 260 product information pertaining to the product, information pertaining to a related product or products, or a coupon redeemable towards the purchase of the product or products. Finally, once the program code of the retail CRM module 240 determines that the customer has purchased one or more product or products, the corresponding opportunity records in the CRM data store 230 can be marked closed-won while remaining opportunities in the CRM data store 230 not resulting in a purchase can be marked pending, or closed-lost as the case may be.

Figure 3:
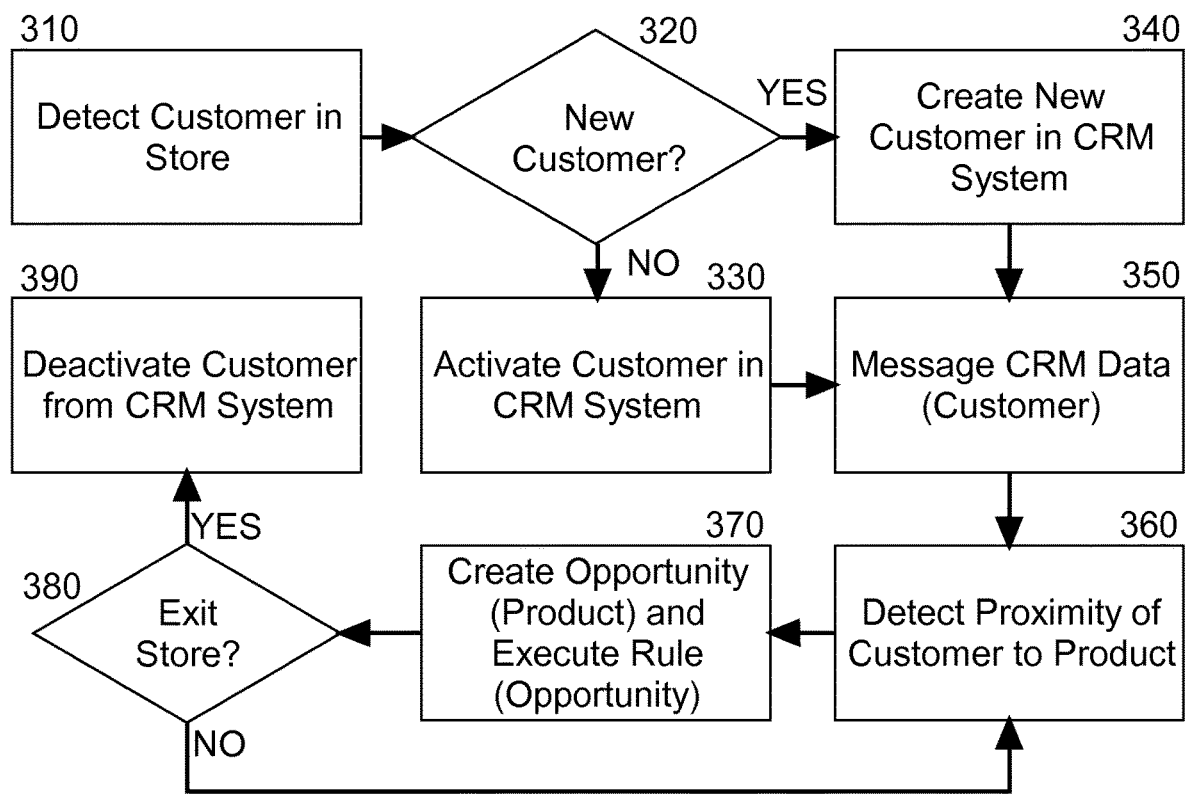

In event yet further illustration of the operation of the program code of the retail CRM module 240, FIG. 3 is a flow chart illustrating a process for CRM in a store. Beginning in block 310, a customer can be detected to have entered the store. In decision block 320, it can be determined whether or not the customer is a new customer or an existing customer. If the customer is a new customer, in block 340 a new customer record can be written to the CRM system. Otherwise, in block 330 an existing record for the customer can be activated in the CRM system. In either circumstance, in block 350 data pertaining to the customer can be messaged to a mobile device of the customer, a sales agent within the store, or both.

In block 360, the proximity of the customer to one or more products can be detected. In response, in block 370 one or more opportunity records can be written to the CRM system for the product or products. Also, one or more rules determining what CRM actions to perform can be triggered with respect to the product or products. In decision block 380, it can be determined whether or not the customer has exited the store. If not, the process can return to block 360 in which the proximity of the customer to one or more products again can be detected and in block 370 one or more opportunity records again can be written to the CRM system for the product or products with one or more rules determining what CRM actions to perform can be triggered with respect to the product or products. In decision block 380, when it is determined that the customer has exited the store, in block 390, the customer can be deactivated from the CRM system with opportunity records marked as closed-won, pending or closed-lost depending upon whether or not the customer purchased any of the products corresponding to the opportunity records created while the customer was determined to have been present within the store.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A customer relationship management (CRM) method for retail environments, the method comprising:
sensing entry of a mobile device into a physical space;
identifying a customer record for a customer in a CRM system associated with the detected mobile device;
detecting a proximity of the mobile device to a product stored in the physical space;
creating an opportunity record in the CRM system in connection with the customer for the product; and,
responsive to sensing egress of the mobile device from the physical space, marking the opportunity record as closed-won if the product has been purchased by the customer and deleting the opportunity record in the CRM system.

2. The method of claim 1, wherein the opportunity record is marked pending responsive to the sensing of the egress of the mobile device from the physical space if the product has not been purchased by the customer.

3. The method of claim 1, wherein the opportunity record is marked closed-lost responsive to the sensing of the egress of the mobile device from the physical space if the product has not been purchased by the customer.

4. The method of claim 1, further comprising triggering a CRM action for the opportunity record.

5. The method of claim 4, wherein the CRM action is transmitting product information for the product to the mobile device.

6. The method of claim 4, wherein the CRM action is transmitting related product information for the product to the mobile device.

7. The method of claim 4, wherein the CRM action is transmitting a coupon for the product to the mobile device.

8. The method of claim 4, wherein the CRM action is messaging a mobile device of a sales agent present within the physical space with information from the customer record and information from the opportunity record.

9. The method of claim 8, wherein the mobile device of the sales agent is smart eye-ware with an optical head-mounted display.

10. A computer program product for customer relationship management (CRM) for retail environments, the computer program product comprising a computer readable storage medium having program instructions embodied therewith, the program instructions executable by a device to cause the device to perform a method comprising:
sensing entry of a mobile device into a physical space;
identifying a customer record for a customer in a CRM system associated with the detected mobile device;
detecting a proximity of the mobile device to a product stored in the physical space;
creating an opportunity record in the CRM system in connection with the customer for the product; and,
responsive to sensing egress of the mobile device from the physical space, marking the opportunity record as closed-won if the product has been purchased by the customer and deleting the opportunity record in the CRM system.

11. The computer program product of claim 10, wherein the opportunity record is marked pending responsive to the sensing of the egress of the mobile device from the physical space if the product has not been purchased by the customer.

12. The computer program product of claim 10, wherein the opportunity record is marked closed-lost responsive to the sensing of the egress of the mobile device from the physical space if the product has not been purchased by the customer.

13. The computer program product of claim 10, wherein the method further comprises triggering a CRM action for the opportunity record.

14. The computer program product of claim 13, wherein the CRM action is transmitting product information for the product to the mobile device.

15. The computer program product of claim 13, wherein the CRM action is transmitting related product information for the product to the mobile device.

16. The computer program product of claim 13, wherein the CRM action is transmitting a coupon for the product to the mobile device.

17. The computer program product of claim 13, wherein the CRM action is messaging a mobile device of a sales agent present within the physical space with information from the customer record and information from the opportunity record.

18. The computer program product of claim 17, wherein the mobile device of the sales agent is smart eye-ware with an optical head-mounted display.

\* \* \* \* \*